(12) United States Patent
Taylor et al.

(10) Patent No.: US 9,091,057 B2
(45) Date of Patent: Jul. 28, 2015

(54) THERMALLY COOLED AND HEATED DECKING

(75) Inventors: William G. Taylor, Columbus, OH (US); Scott A. Haemmerle, Cincinnati, OH (US)

(73) Assignee: CPG International LLC, Scranton, PA (US)

( * ) Notice: Subject to any disclaimer, the term of this patent is extended or adjusted under 35 U.S.C. 154(b) by 0 days.

(21) Appl. No.: 13/471,101

(22) Filed: May 14, 2012

(65) Prior Publication Data

US 2012/0285107 A1     Nov. 15, 2012

Related U.S. Application Data

(60) Provisional application No. 61/485,194, filed on May 12, 2011.

(51) Int. Cl.
*E04B 5/48* (2006.01)
*F24J 3/08* (2006.01)

(52) U.S. Cl.
CPC . *E04B 5/48* (2013.01); *F24J 3/081* (2013.01); *Y02E 10/12* (2013.01)

(58) Field of Classification Search
CPC .......... E04B 2/42; E04B 5/08; E04B 1/7023; E04B 1/7069; E04B 1/7038; E04C 2/521; E04C 1/397; E04C 5/48; F24D 3/14; F24D 3/141; F24D 3/148
USPC ...................... 52/220.3, 223.7, 302.4; 165/49
See application file for complete search history.

(56) References Cited

U.S. PATENT DOCUMENTS

| | | | | |
|---|---|---|---|---|
| 5,415,155 | A * | 5/1995 | Cohen et al. | 126/663 |
| 5,509,246 | A * | 4/1996 | Roddy | 52/533 |
| 5,600,930 | A * | 2/1997 | Drucker | 52/585.1 |
| 6,860,073 | B2 * | 3/2005 | Chien | 52/220.1 |
| 8,074,639 | B2 * | 12/2011 | Dzegan | 126/704 |
| 2004/0080071 | A1 * | 4/2004 | Jo et al. | 264/136 |
| 2008/0282638 | A1 * | 11/2008 | Douglass | 52/578 |

* cited by examiner

*Primary Examiner* — Brian Glessner
*Assistant Examiner* — Adam Barlow
(74) *Attorney, Agent, or Firm* — Standley Law Group LLP

(57) ABSTRACT

Deck components and related systems and methods for circulating a fluid for thermally cooling and/or heating a deck component. An exemplary embodiment of a deck component has a body that comprises a passageway for receiving a fluid, which is adapted to cool and/or heat the deck component. The passageway may extend partially or completely through the body of the deck component.

23 Claims, 2 Drawing Sheets

THERMALLY COOLED AND HEATED DECKING

This application claims the benefit of U.S. Provisional Application No. 61/485,194, filed May 12, 2011, which is hereby incorporated by reference in its entirety.

BACKGROUND AND SUMMARY OF THE INVENTION

Exemplary embodiments of the present invention relate generally to decking. When decking is exposed to sunlight, particularly in southern locations, it can become extremely hot. The heat can cause it to be uncomfortable to touch. The decking can also radiate an undesirable amount of heat.

Conversely, such as in colder climates or seasons, other undesirable conditions may be exhibited. Decking may become slippery when it is wet or covered in ice or frost. Also, snow may accumulate on a deck, particularly if it is elevated above the ground.

In addition, decking may expand and contract due to changes in temperature. Plastic or plastic composite decking may be particularly susceptible to such expansion and contraction. Excessive expansion and contraction may eventually compromise the aesthetic or structural quality of the deck.

These undesirable conditions may be exhibited by decking comprised of any type of material. However, plastic or plastic composite decking may be more susceptible to these conditions due to the plastic content. In addition, darker colors are often desirable in plastic or plastic composite decking to emulate exotic woods, but the darker colors may also exacerbate the undesirable conditions associated with excessive heat.

There is a need to address these undesirable conditions that may be associated with decking, most particularly plastic or plastic composite decking. Exemplary embodiments of the present invention may address some or all of the aforementioned conditions by providing a system and method for circulating a fluid through the decking. Another exemplary embodiment may be a deck board or other deck component configured to allow for passage or circulation of a fluid for cooling and/or heating. While some exemplary embodiments may be dedicated to providing cooling or heating, other exemplary embodiments may be configured to provide both cooling and heating as desired.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed to decking and related systems and methods for cooling and/or heating the decking. Exemplary embodiments are particularly useful with plastic or plastic composite decking due to the plastic content. However, other exemplary embodiments may be useful with other types of decking including, but not limited to, wood and metal decking.

Figure 1:
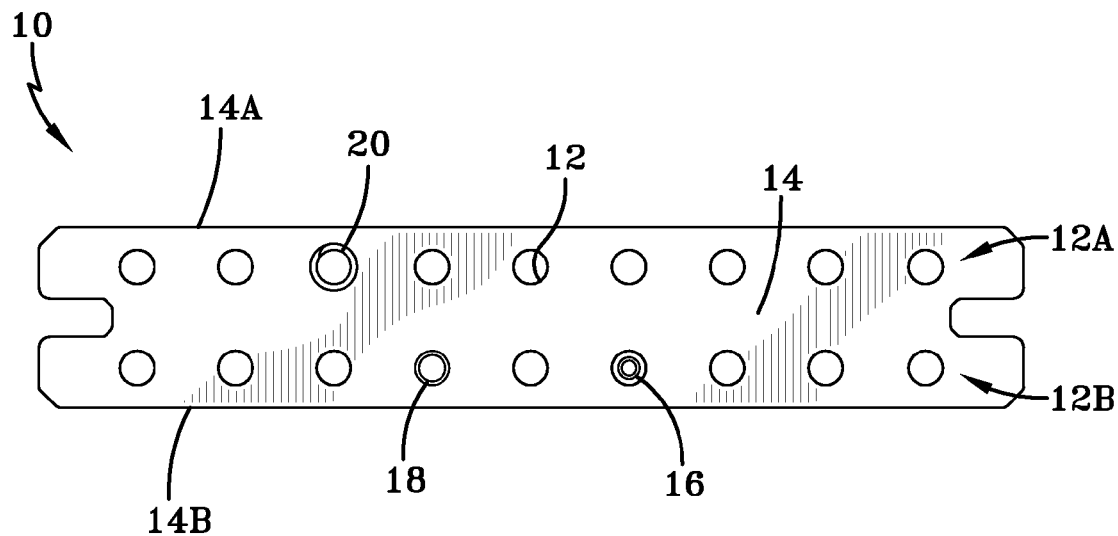
FIG. 1 is an end elevation view of an exemplary embodiment of a deck board of the present invention.

FIG. 1 shows an example of a deck board 10 of the present invention. Various options are shown in this example. Deck board 10 includes at least one passageway 12 that is adapted to receive a fluid for cooling and/or heating the deck board 10. This example of deck board 10 includes eighteen of the passageways 12 for desirable distribution of cooling and/or heating. Other examples may have a fewer or greater number of passageways 12. For example, another embodiment may only have a single passageway 12. The size and number of passageways 12 may be selected to enable or provide desirable cooling and/or heating results.

A passageway 12 may extend partially or all the way through the body 14 of the deck board 10. In this example, a passageway 12 extends completely through the length of body 14 of deck board 10. In another embodiment, a passageway may extend completely or partially along a width of body 14.

In the example of FIG. 1, the body 14 comprises a first side 14A and a second side 14B, which oppose each other and are substantially straight. At least one passageway 12 may be adjacent to and/or substantially aligned with the first side 14A, and at least one passageway 12 may be adjacent to and/or aligned with the second side 14B. More particularly, in this exemplary embodiment, a first row 12A of passageways 12 is adjacent to the first side 14A, and a second row 12B of passageways 12 is adjacent to the second side 14B. Such an embodiment may be particularly useful for achieving more uniform temperature distribution on multiple sides of the deck board 10. However, in other exemplary embodiments, a passageway or passageways may be selectively positioned in other locations to achieve desirable distribution of cooling and/or heating.

At least one tube or pipe 16 may be used in some exemplary embodiments for circulating the fluid used for heating and/or cooling. In particular, a passageway 12 may be adapted to receive a tube or pipe 16 to prevent the deck board 10 from coming into contact with the fluid for cooling and/or heating. A tube or pipe 16 may have any suitable shape and dimensions, and it may be comprised of any suitable material including, but not limited to, PEX, copper, PVC, and other plastic and metal tubing. In another exemplary embodiment, a passageway 12 may be lined with a material layer 18 that prevents the fluid from coming into contact with the main substrate of body 14 of deck board 10. For example, a plastic or other sufficiently impervious material layer 18 (i.e., adapted to limit damage to body 14 by the fluid) may be integral (e.g., coextruded) with, or otherwise applied on or associated with, the main substrate of body 14 in some exemplary embodiments. For example, in another embodiment, a sufficiently impervious material may be removably associated with the passageway(s) 12. This may be useful, for instance, when the deck board 10 is comprised of a plastic composite that includes cellulosic or other organic filler, or any other material that is susceptible to damage if it comes into contact with the fluid.

In some exemplary embodiments, a deck board 10 may include or be fitted with at least one male or female connector 20. At least one connector 20 may be particularly useful in conjunction with an embodiment that has a passageway 12 lined with a material layer 18. In such an embodiment, a connector 20 may be configured to be connected to an inlet or outlet tube or pipe for the fluid. However, other exemplary embodiments may also utilize at least one connector 20. One example of a connector 20 is a connector (e.g., an injection molded piece) that may be secured to (e.g., screwed into) the end or other suitable portion of the board. In some embodiments, a connector 20 may be removably associated with board. Other variations are possible. For instance, one other example is a connector (e.g., female connector) that may be integrally formed in the board 10.

The fluid may be any suitable fluid. In one exemplary embodiment, the fluid may be a liquid such as water. In another exemplary embodiment, a fluid may be a mixture of water and anti-freeze (e.g., propylene glycol). Other suitable heat transfer fluids may also be used.

Figure 2:
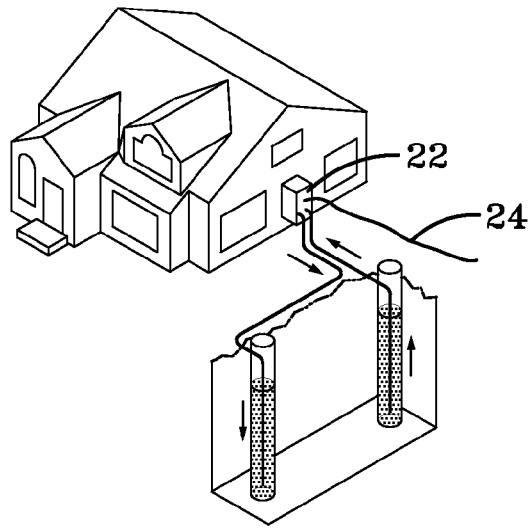
FIG. 2 is an example of an open loop geothermal system that may be used for circulating the fluid for cooling or heating.
Figure 3:
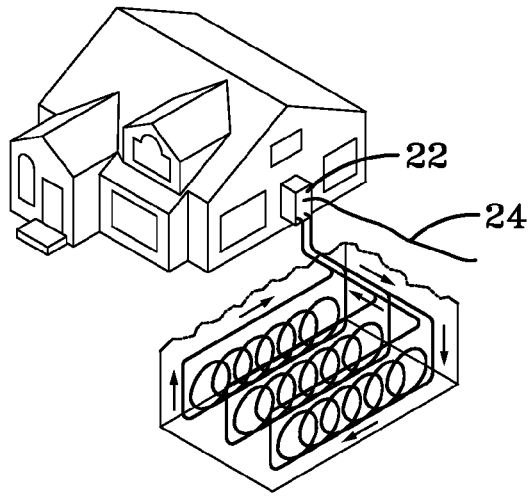
FIG. 3 is an example of a horizontal, closed loop geothermal system that may be used for circulating the fluid for cooling or heating.
Figure 4:
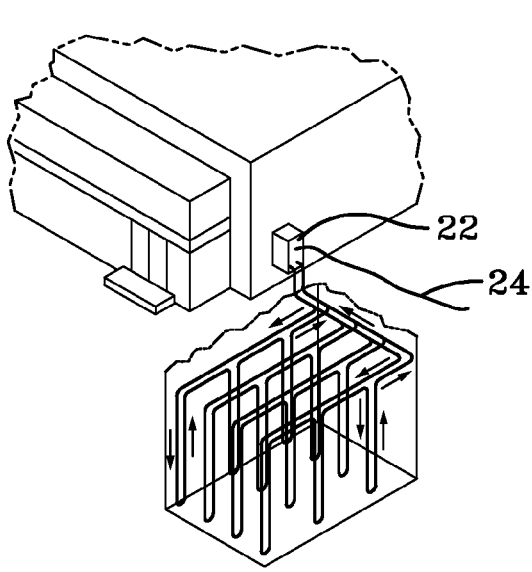
FIG. 4 is an example of a vertical, closed loop geothermal system that may be used for circulating the fluid for cooling or heating.
Figure 5:
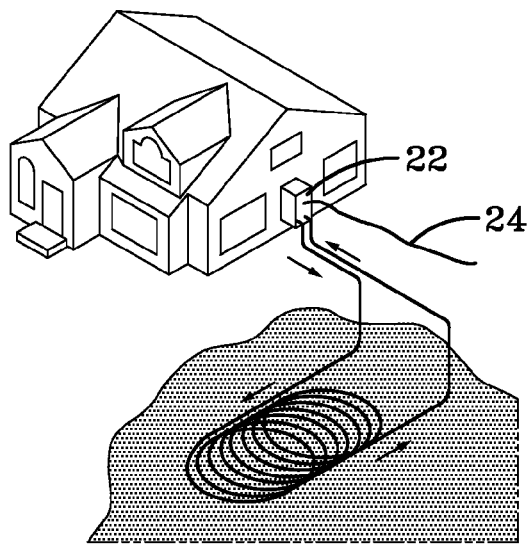
FIG. 5 is an example of a closed loop geothermal system (utilizing a pond, lake, well, or other body of water) that may be used for circulating the fluid for cooling or heating.

FIGS. 2 through 5 show examples of geothermal systems that may be used in association with deck board 10. FIG. 2 shows an example of an open loop system, and FIGS. 3-5 show examples of closed loop systems. FIG. 3 shows an example of a horizontal, closed loop system, whereas FIG. 4 shows an example of a vertical, closed loop system. In another embodiment of a closed loop system as shown in FIG. 5, a body of water such as a pond, lake, or well may be used to facilitate heat transfer. In each embodiment, the geothermal tubing is connected to a heat pump or other suitable heat exchanger 22. In turn, at least one tube or pipe 24 may facilitate transfer of the cooled or heated fluid to deck board 10 for cooling or heating.

In other exemplary embodiments, any suitable system for cooling and/or heating may also be used. For example, a furnace may be used for heating the fluid in some exemplary embodiments. In other exemplary embodiments, a refrigeration system may be used for the fluid. Other types of heat exchangers or other suitable heating and cooling devices may also be used.

Figure 6:
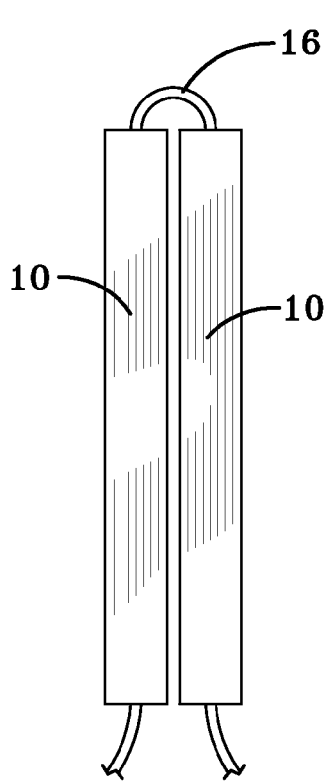
FIG. 6 is a schematic of an exemplary embodiment of a system for thermally cooling and/or heating deck components.
Figure 7:
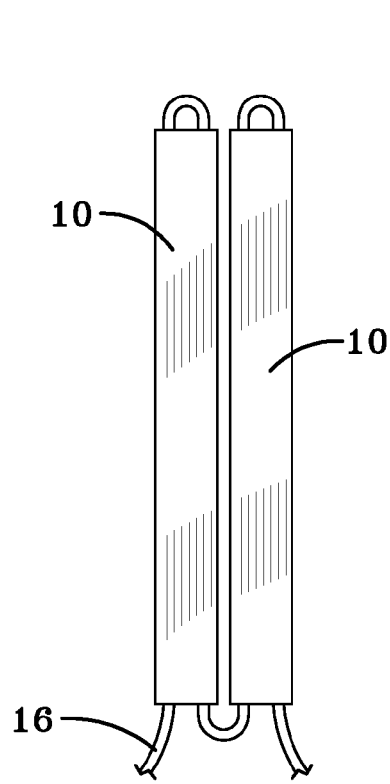
FIG. 7 is a schematic of an exemplary embodiment of a system for thermally cooling and/or heating deck components.
Figure 8:
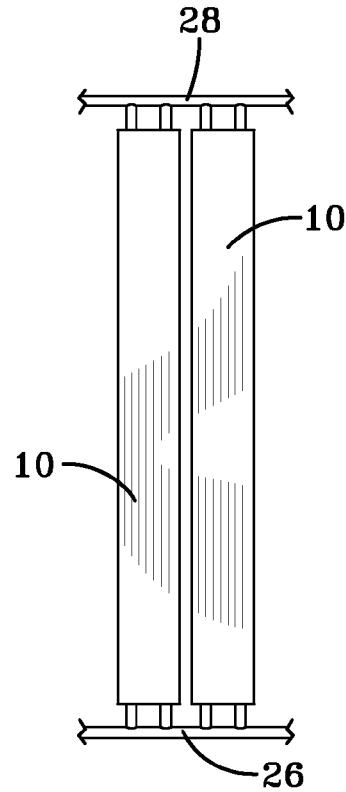
FIG. 8 is a schematic of an exemplary embodiment of a system for thermally cooling and/or heating deck components.

FIGS. 6 through 8 show examples of systems for transferring a cooling or heating fluid through decking. In FIG. 6, at least one tube or pipe (e.g., tube or pipe 16) passes through a first deck board 10 then through a second deck board 10 and so on. In FIG. 7, at least one tube or pipe (e.g., tube or pipe 16) passes back and forth any desired number of times through a first deck board 10 and then back and forth any desired number of times through a second deck board 10 and so on. FIG. 8, on the other hand, shows a system that utilizes a first manifold 26 and a second manifold 28. In this example, the fluid is transferred from the first manifold 26 to the second manifold 28 for cooling or heating deck boards 10. Tubes or pipes may connect the first manifold 26 to the second manifold 28, or the manifolds may be placed in fluid communication with deck boards 10 with the use of connectors.

Any of the aforementioned examples may be adapted to work with multiple tubes or connectors. Also, the aforementioned examples may be adapted to work with any suitable number of deck boards. In addition, any of the aforementioned examples may be adapted to work with any other deck components including, but not limited to, posts and rails. Furthermore, trim boards or other suitable components may be used to hide the tube or pipe or manifold (e.g., tube or pipe 16, manifold 26, and/or manifold 28) that transfers the fluid. Finally, it should be recognized that tube or pipe 16 may be the same as, or in fluid communication with, tube or pipe 24 in some exemplary embodiments.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A deck component comprising:
   a body comprised of a cellulosic composite, said body comprising a first end and a second end opposite said first end;
   at least one passageway extending completely within and through said cellulosic composite all the way from said first end to said second end of said body; and
   a material layer lining said at least one passageway such that said material layer is integral with said body, said material layer comprised of a material that is different than said cellulosic composite and substantially impervious to water such that said material layer is adapted to prevent water from coming into contact with said cellulosic composite in said at least one passageway.

2. The deck component of claim 1 wherein a first substantially straight side opposes a second substantially straight side of said body.

3. The deck component of claim 2 wherein:
   a plurality of said passageways extend completely within and through said cellulosic composite all the way from said first end to said second end of said body;
   a first row of said passageways is adjacent to said first substantially straight side of said body; and
   a second row of said passageways is adjacent to said second substantially straight side of said body.

4. The deck component of claim 1 wherein:
   a plurality of said passageways extend completely within and through said cellulosic composite all the way from said first end to said second end of said body; and
   at least one row of said passageways extends across a width of said body.

5. The deck component of claim 1 wherein:
   said at least one passageway is associated with at least one connector that is adapted to be connected to an inlet or outlet tube or pipe to facilitate fluid transfer; and
   said at least one passageway is adapted to receive fluid for thermally cooling and/or heating said deck component.

6. The deck component of claim 5 wherein said at least one connector is integrally formed in said deck component.

7. The deck component of claim 5 wherein said at least one connector is removably associated with said deck component.

8. A deck component comprising:
a body comprised of a cellulosic composite, said body having a substantially straight side that extends between a first end and a second end;
a plurality of passageways extending completely within and through said cellulosic composite all the way from said first end to said second end such that said passageways are substantially aligned with said substantially straight side of said body; and
a material layer lining each of said passageways such that said material layer is integral with said body, said material layer comprised of a material that is different than said cellulosic composite and substantially impervious to water such that said material layer is adapted to prevent water from coming into contact with said cellulosic composite in said passageways.

9. The deck component of claim 8 wherein at least one row of said passageways extends across a width of said body.

10. The deck component of claim 8 wherein:
at least one said passageway is associated with at least one connector that is adapted to be connected to an inlet or outlet tube or pipe to facilitate fluid transfer; and
said at least one said passageway is adapted to receive fluid for thermally cooling and/or heating said deck component.

11. The deck component of claim 10 wherein said at least one connector is integrally formed in said board.

12. A method for circulating a fluid through a deck component, said method comprising:
providing a deck component comprising:
a body comprised of a cellulosic composite, said body having a first end and a second end opposite said first end;
at least one passageway extending completely within and through said cellulosic composite all the way from said first end to said second end of said body; and
a material layer lining said at least one passageway such that said material layer is integral with said body, said material layer comprised of a material that is different than said cellulosic composite and substantially impervious to water such that said material layer is adapted to prevent water from coming into contact with said cellulosic composite in said at least one passageway; and
circulating a fluid through said at least one passageway.

13. The deck component of claim 1 wherein said body further comprises a first substantially straight side and a second substantially straight side opposite said first substantially straight side such that each said end connects said first substantially straight side to said second substantially straight side.

14. The deck component of claim 13 wherein:
a plurality of said passageways extend completely within and through said cellulosic composite all the way from said first end to said second end of said body;
at least one said passageway is adjacent and relatively more close to said first substantially straight side of said body; and
and at least one said passageway is adjacent and relatively more close to said second substantially straight side of said body;
wherein said passageways are adapted to receive fluid for thermally cooling and/or heating said deck component.

15. The deck component of claim 1 wherein said at least one passageway is adapted to receive fluid for thermally cooling and/or heating said deck component.

16. The deck component of claim 1 wherein a length of said body extends from said first end to said second end.

17. The deck component of claim 1 wherein:
a plurality of said passageways extend completely within and through said cellulosic composite all the way from said first end to said second end of said body; and
said material layer lines each of said passageways.

18. The deck component of claim 8 wherein said passageways are adapted to receive fluid for thermally cooling and/or heating said deck component.

19. The deck component of claim 8 wherein said body comprises a second substantially straight side that opposes said first substantially straight side of said body.

20. The deck component of claim 10 wherein said at least one connector is removably associated with said deck component.

21. The deck component of claim 1 wherein said material layer is a coextruded layer with said cellulosic composite.

22. The deck component of claim 8 wherein said material layer is a coextruded layer with said cellulosic composite.

23. The method of claim 12 wherein the step of providing said deck component comprises coextruding said material layer with said cellulosic composite such that said material layer lines said at least one passageway.

* * * * *